United States Patent
Zou et al.

(10) Patent No.: US 12,031,837 B2
(45) Date of Patent: Jul. 9, 2024

(54) METHOD AND DEVICE FOR UPDATING MAP

(71) Applicant: GOERTEK INC., Shandong (CN)

(72) Inventors: Libing Zou, Shandong (CN); Yifan Zhang, Shandong (CN); Fuqiang Zhang, Shandong (CN); Baoming Li, Shandong (CN)

(73) Assignee: GOERTEK INC., Shandong (CN)

( * ) Notice: Subject to any disclaimer, the term of this patent is extended or adjusted under 35 U.S.C. 154(b) by 310 days.

(21) Appl. No.: 17/309,926

(22) PCT Filed: Nov. 6, 2020

(86) PCT No.: PCT/CN2020/126984
§ 371 (c)(1),
(2) Date: Jun. 30, 2021

(87) PCT Pub. No.: WO2021/135645
PCT Pub. Date: Jul. 8, 2021

(65) Prior Publication Data
US 2022/0307859 A1    Sep. 29, 2022

(30) Foreign Application Priority Data
Dec. 31, 2019 (CN) .......................... 201911412950.4

(51) Int. Cl.
G01C 21/00    (2006.01)
G01C 21/32    (2006.01)

(52) U.S. Cl.
CPC ......... G01C 21/3837 (2020.08); G01C 21/32 (2013.01); G01C 21/3848 (2020.08)

(58) Field of Classification Search
CPC ............... G01C 21/3837; G01C 21/32; G01C 21/3848; G01C 21/30
See application file for complete search history.

(56) References Cited

U.S. PATENT DOCUMENTS

| 2008/0208454 A1 | 8/2008 | Pesterev et al. |
| 2008/0268830 A1* | 10/2008 | Sharma ................. H04W 4/029 455/421 |
| 2014/0142891 A1* | 5/2014 | Lucidarme ........... G05D 1/0274 702/159 |

FOREIGN PATENT DOCUMENTS

| CN | 108507579 A | 9/2018 |
| CN | 108682027 A | 10/2018 |

(Continued)

OTHER PUBLICATIONS

English translation of CN-110118554-A (Year: 2023).*
(Continued)

*Primary Examiner* — Rami Khatib
*Assistant Examiner* — Shahira Baajour
(74) *Attorney, Agent, or Firm* — LKGlobal | Lorenz & Kopf, LLP (57) ABSTRACT

The present application discloses a method and device for updating a map. The method for updating a map according to the present embodiment includes: in a process of movement of a robot, when it is detected that an actual environment is different from an environment that is indicated by a global map that has already been established, starting up map updating, and establishing an initial local map; determining a locating point according to acquired sensor data and the global map, and optimizing the initial local map according to the locating point, to obtain an optimized local map; and covering a corresponding area of the global map by using the optimized local map, to complete updating of the global map. The embodiments of the present application improve the locating accuracy, ensure the speed and efficiency of the map updating, and save time.

9 Claims, 3 Drawing Sheets

(56) References Cited

FOREIGN PATENT DOCUMENTS

| | | | | |
|---|---|---|---|---|
| CN | 108896050 | A | 11/2018 | |
| CN | 109506641 | A | 3/2019 | |
| CN | 110060277 | A | 7/2019 | |
| CN | 110070615 | A | 7/2019 | |
| CN | 110118554 | A | 8/2019 | |
| CN | 110490900 | A | 11/2019 | |
| CN | 111060113 | A | 4/2020 | |
| CN | 111765892 | A * | 10/2020 | ............ G01C 21/30 |
| JP | 2017097402 | A | 6/2017 | |

OTHER PUBLICATIONS

English translation of CN-109506641-A (Year: 2023).*
English Translation of CN-108682027-A (Year: 2023).*
English Translation of CN-111765892-A (Year: 2023).*

* cited by examiner

METHOD AND DEVICE FOR UPDATING MAP

CROSS-REFERENCE TO RELATED APPLICATION

This Application is a U.S. National-Stage entry under 35 U.S.C. § 371 based on International Application No. PCT/CN2020/126984, filed Nov. 6, 2020 which was published under PCT Article 21(2) and which claims priority to Chinese Application No. 201911412950.4, filed Dec. 31, 2019, which are all hereby incorporated herein in their entirety by reference.

TECHNICAL FIELD

This Application pertains to the technical field of robots, and particularly relates to a method and device for updating a map.

BACKGROUND

With the development of the technology of artificial intelligence, increasingly more intelligent robots become available in everyday life. In the field of SLAM (Simultaneous Localization and Mapping), the map is the basis of a series of actions of robots such as locating and path planning and dispatching, and therefore a well-established and high-quality map is the key to the smooth completion of the tasks of robots. However, in the practical usage, the map frequently fails; in other words, because the environment or space continuously changes, the actual situation is greatly different from the information in the map, which results in erroneous locating. In addition, other objects, desirable features and characteristics will become apparent from the subsequent summary and detailed description, and the appended claims, taken in conjunction with the accompanying drawings and this background.

SUMMARY

In view of the above problems, the present application is proposed to provide a method and device for updating a map that overcomes the above problems or at least partially solves the above problems, which can perform automatic detection and incremental updating of the map, which improves the accuracy of the locating.

According to an aspect of the embodiments of the present application, there is provided a method for updating a map, wherein the method for updating a map comprises:

in a process of movement of a robot, when it is detected that an actual environment is different from an environment that is indicated by a global map that has already been established, starting up map updating, and establishing an initial local map;

determining a locating point according to acquired sensor data and the global map, and optimizing the initial local map according to the locating point, to obtain an optimized local map; and covering a corresponding area of the global map by using the optimized local map, to complete updating of the global map.

According to another aspect of the embodiments of the present application, there is provided a device for updating a map, wherein the device for updating a map comprises:

a compositing module, configured for, in a process of movement of a robot, when it is detected that an actual environment is different from an environment that is indicated by a global map that has already been established, starting up map updating, and establishing an initial local map;

an optimizing module, configured for determining a locating point according to acquired sensor data and the global map, and optimizing the initial local map according to the locating point, to obtain an optimized local map; and an updating module, configured for covering a corresponding area of the global map by using the optimized local map, to complete updating of the global map.

In the method and device for updating a map according to the embodiments of the present application, in the process of the movement of the robot, if it is detected that the actual environment is different from the environment that is indicated by the global map that has already been established, map updating is started up, the initial local map is established, the locating point is determined, the initial local map is optimized according to the locating point, and the corresponding area of the global map is covered by using the optimized local map, to complete the updating of the global map.

In an aspect, in the embodiments of the present application, in a process of movement of a robot, once it is detected that the actual situation is not consistent with the information of the global map, the step of map updating can be started up, to update the failed area of the global map, which prevents the technical problem of erroneous movement locating of the robot caused by delayed map updating caused by change in the environment. In another aspect, in the embodiments of the present application, after change in the environment has been detected, the updating is performed by establishing the local map and covering the corresponding area of the global map by using the local map, wherein merely the part of the global map that is not consistent with the actual situation is required to be updated, which has a small data volume, which ensures the speed and efficiency of the map updating, and saves time.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The exemplary embodiments of the present application will be described in further detail below by referring to the drawings. Although the drawings illustrate the exemplary embodiments of the present application, it should be understood that the present application can be implemented in various forms, which should not be limited by the embodiments illustrated herein. In contrast, the purpose of providing those embodiments is to more clearly understand the present application, and to completely convey the scope of the present application to a person skilled in the art.

The design concept of the present application is that: aiming at the problem of erroneous locating of a moving robot caused by delayed map updating caused by change in the environment, a solution of map updating based on the detection of change in the environment is proposed. In other words, when it is detected that the actual environment does not match with a global map that has already been established, a local map is started to be established, simultaneously anchoring points (i.e., locating points) are quickly searched for between the global map and the local map, local optimization is started when the anchoring points in an anchoring-point set (i.e., the locating-point set) satisfy a preset condition, and finally the updating of the global map is performed by using the anchoring points as the reference.

Figure 1:
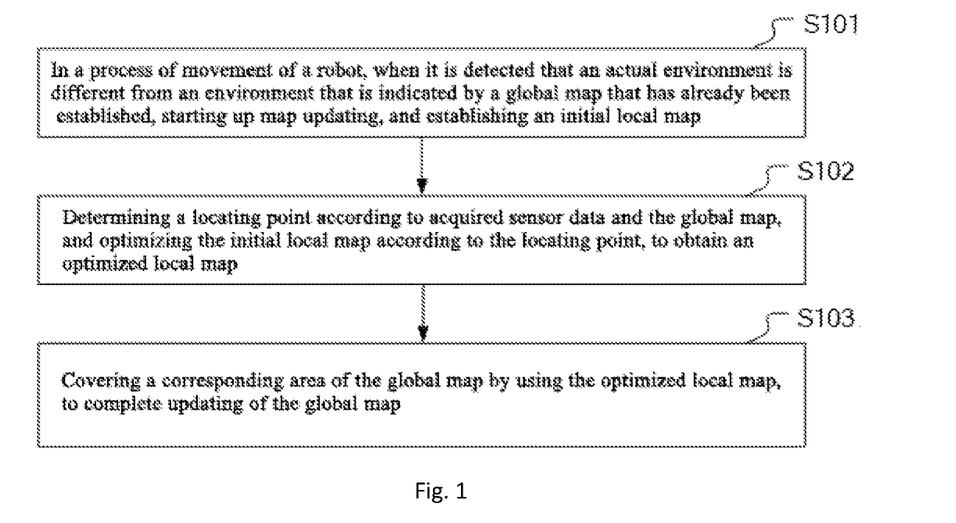
FIG. 1 shows a schematic flow chart of the method for updating a map according to an embodiment of the present application.

FIG. 1 shows a schematic flow chart of the method for updating a map according to an embodiment of the present application. Referring to FIG. 1, the method for updating a map according to the present embodiment comprises:

Step S101, in a process of movement of a robot, when it is detected that an actual environment is different from an environment that is indicated by a global map that has already been established, starting up map updating, and establishing an initial local map. For example, the following scene is taken as an example. In the stage of the establishment of the global map, there was a storage rack in a warehouse by a window. Then the storage rack is artificially moved to the doorway, but the global map is not updated. Therefore, the state of the grid corresponding to the window side in the global map is "occupied"; in other words there is still a storage rack by the window. However, in the actual environment there is no storage rack by the window, and the state of the grid corresponding to the window side in the global map should be the state "not occupied". The robot, in the process of moving, according to the sensor data, detects whether the actual environment is consistent with the environment that is indicated by the global map that has already been established, and if they are different, the robot according to the present embodiment starts up the map updating, and establishes the initial local map.

Step S102, determining a locating point according to acquired sensor data and the global map, and optimizing the initial local map according to the locating point, to obtain an optimized local map. The locating point may also be referred to as an anchoring point, and refers to a position point that is used to anchor the local map and the global map. Because laser-radar ranging has the characteristics of a high accuracy, a simple error model and stable operation in environments except strong-light direct incidence, the sensor data herein are for example the data that are gathered by a laser sensor.

Step S103, covering a corresponding area of the global map by using the optimized local map, to complete updating of the global map.

It can be known from FIG. 1 that the method for updating a map according to the present embodiment can, in the process of the moving of the robot, update the area in the global map that is different from the actual environment, which improves the accuracy of the robot locating, and does not require to re-establish the global map, which saves the time of the map updating, and ensures the efficiency of the locating. In conclusion, the map updating according to the present embodiment, as compared with other modes of map updating, is more timely and has a higher accuracy, which is suitable for the incremental updating of a map in the scene of change in the environment of a small area.

Figure 2:
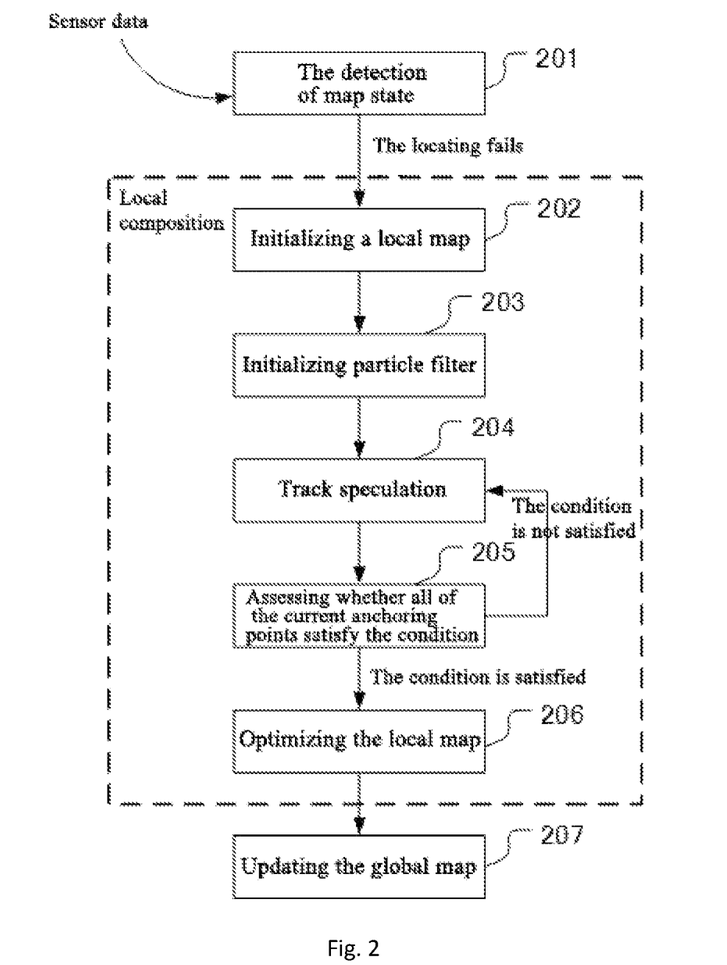
FIG. 2 shows a flow chart of the method for updating a map according to an embodiment of the present application.

The method for updating a map according to the present embodiment mainly comprises the three steps of the detection of the map state, the local composition and the map updating. FIG. 2 shows a flow chart of the method for updating a map according to an embodiment of the present application. Referring to FIG. 2, the method for updating a map particularly comprises the following steps:

Step 201, the detection of map state.

The map-state detection refers to detecting the state of the global map, i.e., detecting whether the global map has failed. The step comprises, in a process of movement of a robot, when it is detected that an actual environment is different from an environment that is indicated by a global map that has already been established, starting up map updating, and establishing an initial local map. One of the particular embodiments of detecting whether the actual environment is consistent with the environment that is indicated by the global map is, for example, acquiring sensor data, and, according to the sensor data, locating a current position of the robot on the global map that has already been established; and if the locating fails, determining that it is detected that the actual environment is different from the environment that is indicated by the global map that has already been established.

The confidence reflects the internal information of the robot regarding the environmental conditions. Because the pose cannot be directly measured, usually the robot does not know its own pose, but it is required to speculate its own pose from the data, and in turn identify out the real state of the robot from the confidence of the pose. The pose of the robot comprises the position information and the angle information (wherein the angle refers to the orientation) of the robot. In the present embodiment, the step of, according to the sensor data, locating the current position of the robot on the global map that has already been established comprises: according to the sensor data, obtaining a current pose and a confidence of the current pose on the global map; and if the confidence is not greater than a preset confidence threshold, the locating failing.

For example, the moving robot receives the data transmitted from a laser-radar sensor, obtains by using the global map and inertial navigation the current pose and the confidence of the current pose on the global map (for example 0.6), compares the confidence 0.6 of the current pose on the global map and a preset confidence threshold (for example 0.8), and knows that the locating fails, as 0.6 is less than 0.8. According to the result of the locating failure, the present embodiment determines that the global map is failed, starts up the map updating, enters the stage of local compositing, and starts the process of local compositing. If the locating succeeds, the navigational locating and moving continue following the global map.

It should be noted that the global map refers to the map that is established by the moving robot by using a sensor (for example, laser) based on the SLAM algorithm before the environment is changed, and the local map refers to the map that is newly established regarding the local area that has been changed in the present embodiment when the local environment has been changed. The process of local compositing comprises the following step 202 to step 206, which are individually explained below.

Step 202, initializing a local map.

After the map updating has been started up, the present embodiment comprises using a position point where a confidence of a corresponding pose before the current pose on the global map is greater than the preset confidence threshold as a first locating point, and, by using the first locating point as a coordinate-system reference origin, initializing a local map, to obtain the initial local map. For example, the last position point $P_0$ of the current position point where the confidence is greater than a preset confidence threshold is used as the first anchoring point, the $P_0$ is saved in an anchoring-point set P and is used as the coordinate-system reference origin, and the local map is initialized. It should be noted that, because the locating point functions to anchor the local map and the global map, in the present embodiment the locating point and the anchoring point have the same meaning, and the locating-point set and the anchoring-point set have the same meaning.

Step 203, initializing particle filter.

Particle filter can eliminate the noise caused by various kinds of interference in the process of track speculation, to improve the accuracy of the local map. Therefore, in the present embodiment, by using a robot locating algorithm based on particle filter, by using a large quantity of particles, the movement state of the robot is simulated. Here, firstly, the particle swarm is initialized to evenly distribute the particles in the space, i.e., causing the particle distribution to follow normal distribution.

Step 204, track speculation.

It can be known from the above that, in order to improve the accuracy of the local map, the present embodiment employs the compositing mode of the combination between particle filter and track speculation. In other words, the step of, based on the inertial-navigation equation, performing the track detection, to obtain the speculated position point comprises: by using particle filter, based on the inertial-navigation equation, performing track detection, to obtain a speculated position point.

By combining with the above step 203, this step comprises, according to the inertial-navigation equation, substituting each of the particles, to obtain a predicted particle (for example, the next position S of the current position O); assessing the predicted particles (the position S) (calculating the weight), wherein the particle that is closer to the real position has a higher weight; and screening the particles according to the particle weights, substituting the re-sampled particles into the inertial-navigation equation to obtain new predicted particles, and repeating the process. The robot, according to the prediction by the inertial-navigation equation, moves to the next position, and then the sensor measures the current position, to obtain a measured position.

Accordingly, in the process of the robot moving in a particular direction or randomly, the next position point of the movement of the robot is speculated by track detection (at this point the robot does not have an effective global map for navigation, so track speculation is employed), and the anchoring point is searched for in the process of the movement according to the result of the track speculation. An important step of the particular embodiments of searching for the anchoring point is determining a locating point according to acquired sensor data and the global map. Particularly, the step comprises, according to the sensor data acquired in the process of movement, obtaining a measured space point; matching the measured space point with a position point on the global map; and if the matching fails, continuing moving and acquiring the sensor data; and if the matching succeeds, determining a position point that is successfully matched as the locating point.

For example, the robot receives the data of the laser sensor while travelling, obtains according to the data of the laser sensor the measured space point, operates the matching algorithm of the space point and the position point on the global map, matches those measured space point on the global map, and, if the matching fails, according to the above contents in the local compositing, continues travelling and searches for the anchoring point; and, if the matching in the global map succeeds (in other words, the confidence of the pose of the position point in the global map is greater than the preset confidence threshold), places the position point that has been successfully matched as the anchoring point into the anchoring-point set, and then starts to assess all of the anchoring points in the current anchoring-point set.

Step 205, assessing whether all of the current anchoring points satisfy the condition; and if yes, executing the step 206, and if not, returning to execute the step 204, to perform track speculation.

In this step, all of the anchoring points are assessed, and if the anchoring points satisfy the condition, the local map is started to be optimized. For example, the step comprises, when a quantity of and/or positions of locating points in a locating-point set satisfy a preset condition, optimizing the initial local map according to the locating points in the locating-point set. If the condition is not satisfied, the process turns to the previous step 204, to continue to search for the next anchoring point. In other words, if the quantity of the locating points in the locating-point set satisfies the preset condition, the initial local map may be optimized according to the locating points in the locating-point set. Alternatively, if the positions of the locating points in the locating-point set satisfy the preset condition, the initial local map may be optimized according to the locating points in the locating-point set. Alternatively, if both of the quantity of and the positions of the locating points in the locating-point set satisfy the preset condition, the initial local map may be optimized according to the locating points in the locating-point set. Preferably, the local map is optimized when both of the quantity of and the positions of the locating points satisfy the condition, which enables the local map to have a high accuracy, and therefore scenes that have a high requirement on the accuracy may employ such a mode.

One of the particular embodiments of the anchoring-point assessment is, when the quantity of the locating points in the locating-point set is greater than three, determining that the quantity of the locating points in the locating-point set satisfies the preset condition; and, when all of the locating points in the locating-point set are not on a same straight line, determining that the positions of the locating points in the locating-point set satisfy the preset condition. The conditions of the quantity of and the positions of the locating points are provided to improve the effect of the optimization of the local map. Because the collineation of the anchoring points will cause the problem in the linear correlation, which results in a poor effect of the optimization, all of the anchoring points should not be collinear. Because of the requirement of non-colinearity, the quantity of the anchoring points is at least 3.

Step 206, optimizing the local map.

By the assessment on the anchoring points in the previous step, the anchoring points that satisfy the condition are obtained. This step uses the currently established grid map as the reference map, uses the anchoring points as the coordinate reference points, and uses the minimized Euclidean distance as the constraint condition. The final target of the optimization is to reduce the error, and improve the accuracy of the local map.

Particularly, the step of optimizing the initial local map according to the locating points in the locating-point set comprises: determining a constraint condition according to a spatial-position coordinate of the locating point in the global map; by using a current position of the robot as a vertex, by using a distance between the current position and a next position as a side, based on an inertial-navigation equation, performing track detection, to obtain a speculated position point; acquiring a measured space point that is obtained by measurement by the robot by using a sensor at a current position; and, according to the speculated position point, the measured space point and the constraint condition, determining a next position point of the movement of the robot, and, based on the next position point, obtaining the optimized local map. The step of, according to the speculated position point, the measured space point and the constraint condition, determining the next position point of the movement of the robot comprises: according to a Euclidean distance between two of the locating points, determining the constraint condition; and for position points located between two of the locating points, calculating sums of errors and constraint conditions of the speculated position point and the measured space point, and, by using least square method, fitting an optimum position point, and determining the optimum position point as the next position point of the movement of the robot.

A local grid map is established by particle filter, and the process of superposing the grid map and the global map has a certain error. Therefore, in the present embodiment, the local map is optimized by using the information of the anchoring points. The optimization employs an improved map optimizing algorithm, which is particularly adding a constraint condition of the anchoring points into the optimization process.

As an example, in the present embodiment an anchoring-point set P ($p_0$, $p_1$, $p_2$, $p_3$ . . . $p_n$) is obtained, wherein the $p_0$, $p_1$ and so on represent the anchoring points. According to the spatial-position relation of the anchoring points in the global map, the constraint B is calculated (wherein B is the Euclidean distance between two of the anchoring points in the anchoring-point set P), which is added, as the constraint condition, into the overall optimizing process.

In the process of the movement of the robot, by using the current position X of the robot as the vertex, wherein the current position X comprises position information and angle information, and, by using the connecting line between the current position and a next position (i.e., a side that is established by the robot moving from a position point to another position point) as the optimizing variable, an optimizing equation minF(x) is obtained.

Regarding the position points located between two locating points (hereinafter referred to as the current position points), a speculated position point is obtained by track detection by using the combination of the inertial-navigation equation and particle filter. At the current position point, the robot, by using the sensor data, for example the data of the laser sensor, may measure to obtain a plurality of measured space points. For example, the robot obtains a certain space point by measurement by using laser at a certain current position, and obtains the distance and the angle between the space point and the robot, wherein the distance and the angle satisfy the following formula:

$$\begin{bmatrix} r \\ b \end{bmatrix} = \begin{bmatrix} \sqrt{(\lambda_x - x)^2 + (\lambda_y - y)^2} \\ \tan^{-1}\left(\dfrac{\lambda_y - y}{\lambda_x - x}\right) - \theta \end{bmatrix}$$

The space point that is measured by using laser can be obtained from the above formula, wherein $\lambda_x$ and $\lambda_y$ are the coordinates of the measured space point, r is the distance by which the robot moves from the current position point to the measured space point, b is the angle corresponding to the movement distance, x and y are the coordinates of the current position point, and θ is the yaw angle of the robot at the current position point.

As stated above, one of the innovations of the present embodiment is adding the constraint on the anchoring points into the optimization process. Therefore, both of the speculated position point and the measured space point have inevitable noise and error. Therefore, the measured space point or the speculated position point cannot be directly used as the next position point of the current position point, but the optimum position point is required to be searched for by using the anchoring points, i.e., to make optimization.

The optimization process is, for example, according to one of the solution methods for optimization, for example least square method, by solving the following formula, obtaining the optimum position point, and completing the optimization of the local map according to the obtained optimum position point:

$$\min F(x) = \Sigma_{k=1}^{n} e_k(x_k) T \Omega_k e_k(x_k) + B$$

In the above formula, $x_k$ represents the vertex, $e_k(x_k)$ is an error between the speculated position point obtained by the speculation from the track and the measured space point measured by using laser, and B is the constraint condition (i.e., the Euclidean distance between the two anchoring points) of the relevant anchoring points (the two neighboring anchoring points of the vertex at the left and right sides) on the global map.

Step 207, updating the global map.

The step comprises covering a corresponding area of the global map by using the optimized local map, to complete updating of the global map. After the optimization of the local map has been completed, the corresponding area in the global map is covered by the local map, to complete the updating of the global map. The particular action of the covering may be implemented by using the prior art, and is not redundantly explained here.

At this point, one process of the map updating has ended.

Accordingly, it can be known that the method for updating a map according to the present embodiment solves the problem of erroneous locating of the moving robot caused by delayed map updating caused by change in the environment, improves the accuracy of the locating, and, by using the incremental updating of the map, ensures the efficiency of the updating.

Figure 3:
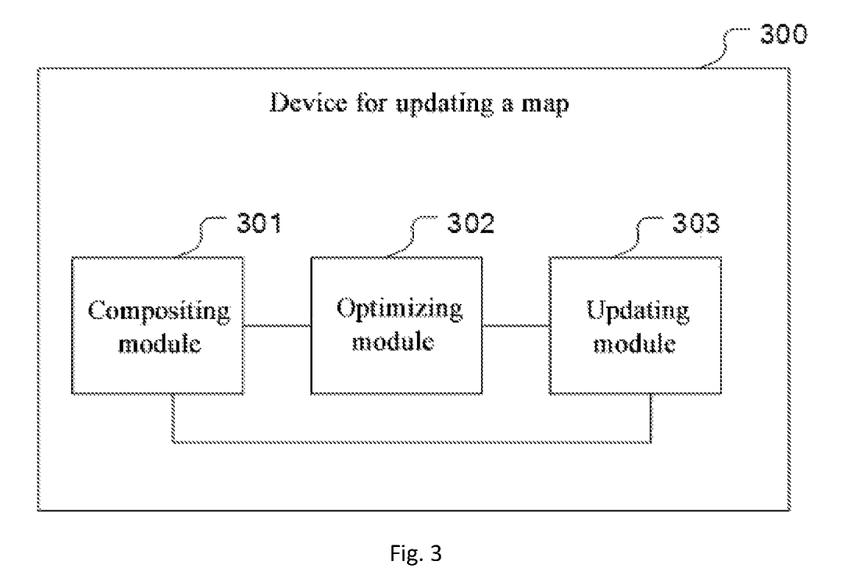
FIG. 3 shows a block diagram of the device for updating a map according to an embodiment of the present application.

FIG. 3 shows a block diagram of the device for updating a map according to an embodiment of the present application. Referring to FIG. 3, the device for updating a map 300 according to the present embodiment comprises:

a compositing module 301, configured for, in a process of movement of a robot, when it is detected that an actual environment is different from an environment that is indicated by a global map that has already been established, starting up map updating, and establishing an initial local map;

an optimizing module 302, configured for determining a locating point according to acquired sensor data and the global map, and optimizing the initial local map according to the locating point, to obtain an optimized local map; and an updating module 303, configured for covering a corresponding area of the global map by using the optimized local map, to complete updating of the global map.

In an embodiment of the present application, the optimizing module 302 is particularly configured for, according to the sensor data acquired in the process of movement, obtaining a measured space point; matching the measured space point with a position point on the global map; and if the matching fails, continuing moving and acquiring the sensor data; and if the matching succeeds, determining a position point that is successfully matched as the locating point.

In an embodiment of the present application, the compositing module 301 is particularly configured for, when a quantity of and/or positions of locating points in a locating-point set satisfy a preset condition, optimizing the initial local map according to the locating points in the locating-point set.

In an embodiment of the present application, the optimizing module 302 is particularly configured for determining a constraint condition according to a spatial-position coordinate of the locating point in the global map; by using a current position of the robot as a vertex, by using a distance between the current position and a next position as a side, based on an inertial-navigation equation, performing track detection, to obtain a speculated position point; acquiring a measured space point that is obtained by measurement by the robot by using a sensor at a current position; and, according to the speculated position point, the measured space point and the constraint condition, determining a next position point of the movement of the robot, and, based on the next position point, obtaining the optimized local map.

In an embodiment of the present application, the optimizing module 302 is particularly configured for, according to a Euclidean distance between two of the locating points, determining the constraint condition; and for position points located between two of the locating points, calculating sums of errors and constraint conditions of the speculated position point and the measured space point, and, by using least square method, fitting an optimum position point, and determining the optimum position point as the next position point of the movement of the robot.

In an embodiment of the present application, the optimizing module 302 is particularly configured for, by using particle filter, based on the inertial-navigation equation, performing track detection, to obtain a speculated position point.

In an embodiment of the present application, the compositing module 301 is particularly configured for acquiring sensor data, and, according to the sensor data, locating a current position of the robot on the global map that has already been established; and if the locating fails, determining that it is detected that the actual environment is different from the environment that is indicated by the global map that has already been established.

In an embodiment of the present application, the compositing module 301 is particularly configured for, according to the sensor data, obtaining a current pose and a confidence of the current pose on the global map; and if the confidence is not greater than a preset confidence threshold, the locating failing.

In an embodiment of the present application, the compositing module 301 is particularly configured for using a position point where a confidence of a corresponding pose before the current pose on the global map is greater than the preset confidence threshold as a first locating point, and, by using the first locating point as a coordinate-system reference origin, initializing a local map, to obtain the initial local map.

In an embodiment of the present application, the optimizing module 302 is particularly configured for, when the quantity of the locating points in the locating-point set is greater than three, determining that the quantity of the locating points in the locating-point set satisfies the preset condition; and, when all of the locating points in the locating-point set are not on a same straight line, determining that the positions of the locating points in the locating-point set satisfy the preset condition.

It should be noted that the particular embodiments of the modules of the above embodiments of the device for updating a map may refer to the particular embodiments of the above corresponding process embodiments, and are not discussed here further.

Figure 4:
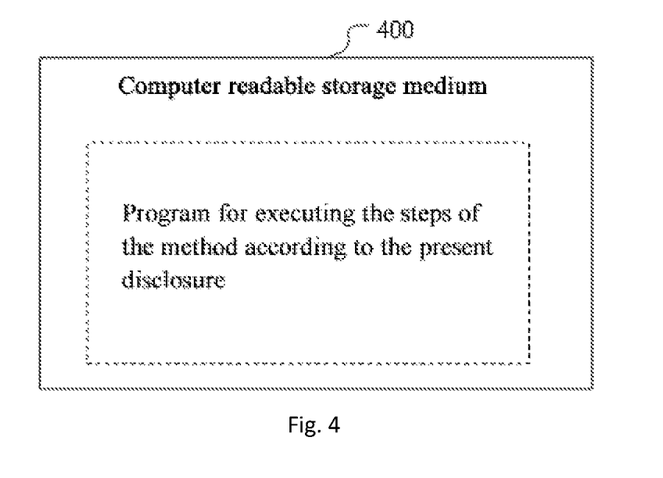
FIG. 4 shows a schematic structural diagram of the computer readable storage medium according to an embodiment of the present application.

Referring to FIG. 4, another embodiment of the present application provides a computer readable storage medium 400, wherein the computer readable storage medium 400 stores a computer instruction, and the computer instruction causes a computer to execute the above-described method for updating a map.

Particularly, the computer program stored in the computer readable storage medium 400 causes the computer to execute the following method:

in a process of movement of a robot, when it is detected that an actual environment is different from an environment that is indicated by a global map that has already been established, starting up map updating, and establishing an initial local map; determining a locating point according to acquired sensor data and the global map, and optimizing the initial local map according to the locating point, to obtain an optimized local map; and covering a corresponding area of the global map by using the optimized local map, to complete updating of the global map.

Optionally, the computer program further causes the computer to execute the following method:

according to the sensor data acquired in the process of movement, obtaining a measured space point; matching the measured space point with a position point on the global map; and if the matching fails, continuing moving and acquiring the sensor data; and if the matching succeeds, determining a position point that is successfully matched as the locating point.

Optionally, the computer program further causes the computer to execute the following method:

determining a constraint condition according to a spatial-position coordinate of the locating point in the global map; by using a current position of the robot as a vertex, by using a distance between the current position and a next position as a side, based on an inertial-navigation equation, performing track detection, to obtain a speculated position point; acquiring a measured space point that is obtained by measurement by the robot by using a sensor at a current position; and, according to the speculated position point, the measured space point and the constraint condition, determining a next position point of the movement of the robot, and, based on the next position point, obtaining the optimized local map.

Optionally, the computer program further causes the computer to execute the following method:

according to a Euclidean distance between two of the locating points, determining the constraint condition; and for position points located between two of the locating points, calculating sums of errors and constraint conditions of the speculated position point and the measured space point, and, by using least square method, fitting an optimum position point, and determining the optimum position point as the next position point of the movement of the robot.

The particular functions that are implemented by the programs of the above embodiment of the computer readable storage medium may refer to the particular contents of the above corresponding process embodiments, and are not discussed here further.

A person skilled in the art should understand that the embodiments of the present application may be provided as a method, a system, or a computer program product. Therefore, the present application may take the form of an entire hardware embodiment, an entire software embodiment, or an embodiment combining software and hardware. Furthermore, the present application may take the form of a computer program product embodied on one or more computer usable storage media (including, but not limited to, disk storage, CD-ROMs, optical memories, etc.) having a computer usable program code recorded thereon.

The present application is described with reference to flow charts and/or block diagrams of the method, the device (system), and the computer program product according to the embodiments of the present application. It should be understood that each flow and/or block in the flow charts and/or block diagrams, and combinations of the flows and/or blocks in the flow charts and/or block diagrams, may be implemented by computer program instructions. The computer program instructions may be provided to a processor of a general-purpose computer, a special-purpose computer, an embedded processor, or other programmable data processing device to generate a machine, so that a device for implementing the functions specified in one or more flows of the flow charts and/or one or more blocks of the block diagrams can be generated by instructions executed by the processor of the computers or the other programmable data processing device.

It should be noted that the terms "include", "comprise" or any variants thereof are meant to cover non-exclusive inclusions, so that processes, methods, articles or devices that include a series of elements do not only include those elements, but also include other elements that are not explicitly listed, or include the elements that are inherent of such processes, methods, articles or devices.

The above are merely particular embodiments of the present application. By the teaching of the present application, a person skilled in the art can make other modifications or variations on the basis of the above embodiments. A person skilled in the art should understand that the above particular descriptions are only for the purpose of better interpreting the present application, and the protection scope of the present application should be subject to the protection scope of the claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A map updating method of a robot, the robot comprises a processor, memory, and a laser sensor, wherein the method comprises:

in a process of movement of the robot, capturing sensor data by the laser sensor;

in the processor, detecting whether an actual environment is different from an environment that is indicated by a global map stored in the memory of the robot, when they are different, establishing an initial local map;

in the processor, determining a locating point according to the sensor data and the global map, and optimizing the initial local map according to the locating point, to obtain an optimized local map; and in the processor, covering a corresponding area of the global map by using the optimized local map, and updating the global map in the memory, wherein determining the locating point according to the sensor data and the global map comprises:

according to the sensor data acquired in the process of movement, obtaining a measured space point;

matching the measured space point with a position point on the global map; and if the matching fails, continuing moving and acquiring the sensor data; and if the matching succeeds, using the position point as the locating point, optimizing the initial local map according to the locating point comprises:

when a quantity of and/or positions of locating points in a locating point set satisfy a preset condition, optimizing the initial local map according to the locating points in the locating points set, optimizing the initial local map according to the locating point further comprises:

determining a constraint condition according to a spatial-position coordinate of the locating point in the global map;

by using a current position of the robot as a vertex, using a distance between the current position and a next position that the robot is moving towards in the process of movement as a side, and using particle filter, based on an inertial-navigation equation, speculating a speculated position point;

measuring the current position of the robot by using the laser sensor, to obtain a measured space point; and according to the speculated position point, the measured space point, and the constraint condition, determining a next target position point of the movement of the robot, and based on the next target position point, obtaining the optimized local map.

2. The method according to claim 1, wherein according to the speculated position point, the measured space point, and the constraint condition, determining the next position point of the movement of the robot comprises:

according to a Euclidean distance between two of the locating points, determining the constraint condition; and for the current position of the robot located between two of the locating points, calculating sums of errors and constraint conditions of the speculated position point and the measured space point, and, by using least square method, fitting an optimum position point, and determining the optimum position point as the next target position point of the movement of the robot.

3. The method according to claim 2, wherein by using a formula of:

$$\min F(x) = \sum_{k=1}^{n} e_k(x_k) T \Omega_k e_k(x_k) + B,$$

and least square method, the optimum position point is fitted:

wherein $x_k$ represents the vertex, $e_k(x_k)$ is an error between the speculated position point and the measured space point, and B is the constraint condition of a relevant anchoring point on the global map.

4. The method according to claim 1, wherein when it is detected that the actual environment is different from the environment that is indicated by a global map that has already been established, establishing the initial local map comprises:
acquiring the sensor data, and, according to the sensor data, locating the current position of the robot on the global map that has already been established; and
if the locating fails, determining that it is detected that the actual environment is different from the environment that is indicated by the global map that has already been established.

5. The method according to claim 4, wherein according to the sensor data, locating the current position of the robot on the global map that has already been established comprises:
according to the sensor data, obtaining a current pose and a confidence of the current pose on the global map; and
if the confidence is not greater than a preset confidence threshold, the locating fails.

6. The method according to claim 5, wherein when it is detected that the actual environment is different from the environment that is indicated by the global map that has already been established, and establishing the initial local map comprises:
using the position point where a confidence of a corresponding pose before the current pose on the global map is greater than the preset confidence threshold as a first of the locating point, and, by using the first of the locating point as a coordinate-system reference origin, initializing the local map, to obtain the initial local map.

7. The method according to claim 6, wherein the preset confidence threshold is 0.8.

8. The method according to claim 1, wherein the step of, when the quantity of and/or the positions of the locating points in the locating-point set satisfy the preset condition, optimizing the initial local map according to the locating points in the locating-point set comprises:
when the quantity of the locating points in the locating-point set is greater than three, determining that the quantity of the locating points in the locating-point set satisfies the preset condition, and optimizing the initial local map according to the locating points in the locating-point set; and
when all of the locating points in the locating-point set are not on a same straight line, determining that the positions of the locating points in the locating-point set satisfy the preset condition, and optimizing the initial local map according to the locating points in the locating-point set.

9. A robot comprising a processor, memory, and a laser sensor, wherein the processor is configured to:
in a process of movement of the robot, capture sensor data by the laser sensor;
detect whether an actual environment is different from an environment that is indicated by a global map stored in the memory of the robot, when they are different, establish an initial local map;
determine a locating point according to the sensor data and the global map, and optimizes the initial local map according to the locating point, to obtain an optimized local map; and
cover a corresponding area of the global map by using the optimized local map, and update the global map in the memory,
the processor is further configured to:
according to the sensor data acquired in the process of movement, obtain a measured space point;
match the measured space point with a position point on the global map;
if the matching fails, continue moving and acquire the sensor data;
if the matching succeeds, use the position point as the locating point,
the processor is further configured to:
when a quantity of and/or positions of locating points in a locating point set satisfy a preset condition, optimize the initial local map according to the locating points in the locating point set,
the processor is further configured to:
determine a constraint condition according to a spatial-position coordinate of the locating point in the global map;
by using a current position of the robot as a vertex, using a distance between the current position and a next position that the robot is moving towards in the process of movement as a side, and using particle filter, based on an inertial-navigation equation, speculating a speculated position point;
measuring the current position of the robot by using the laser sensor, to obtain a measured space point; and
according to the speculated position point, the measured space point, and the constraint condition, determining a next target position point of the movement of the robot, and based on the next target position point, obtaining the optimized local map.

* * * * *